US007937572B2

(12) United States Patent
Augusteijn et al.

(10) Patent No.: US 7,937,572 B2
(45) Date of Patent: May 3, 2011

(54) RUN-TIME SELECTION OF FEED-BACK CONNECTIONS IN A MULTIPLE-INSTRUCTION WORD PROCESSOR

(75) Inventors: Alexander Augusteijn, Eindhoven (NL); Jeroen Anton Johan Leijten, Hulsel (NL)

(73) Assignee: Silicon Hive B.V., Eindhoven (NL)

( * ) Notice: Subject to any disclaimer, the term of this patent is extended or adjusted under 35 U.S.C. 154(b) by 77 days.

(21) Appl. No.: 11/568,984

(22) PCT Filed: May 9, 2005

(86) PCT No.: PCT/IB2005/051502
§ 371 (c)(1),
(2), (4) Date: Nov. 13, 2006

(87) PCT Pub. No.: WO2005/111793
PCT Pub. Date: Nov. 24, 2005

(65) Prior Publication Data
US 2007/0174590 A1 Jul. 26, 2007

(30) Foreign Application Priority Data

May 13, 2004 (EP) .................................... 04102109

(51) Int. Cl.
*G06F 9/30* (2006.01)
*G06F 9/305* (2006.01)
(52) U.S. Cl. ........................................ 712/235; 712/236
(58) Field of Classification Search .................. 712/214, 712/215, 234, 236, 235
See application file for complete search history.

(56) References Cited

U.S. PATENT DOCUMENTS

| 4,833,599 | A | * | 5/1989 | Colwell et al. ................ 712/236 |
| 5,450,556 | A | | 9/1995 | Slavenburg et al. |
| 5,471,593 | A | * | 11/1995 | Branigin ........................ 712/235 |
| 5,581,717 | A | * | 12/1996 | Boggs et al. .................. 712/208 |
| 5,659,722 | A | * | 8/1997 | Blaner et al. .................. 712/234 |
| 5,668,985 | A | * | 9/1997 | Carbine et al. ................ 712/245 |
| 5,673,427 | A | * | 9/1997 | Brown et al. .................. 712/245 |
| 6,157,988 | A | * | 12/2000 | Dowling ........................ 711/140 |
| 6,269,439 | B1 | * | 7/2001 | Hanaki ........................... 712/235 |
| 6,442,678 | B1 | * | 8/2002 | Arora ............................. 712/218 |
| 6,513,109 | B1 | * | 1/2003 | Gschwind et al. ............ 712/200 |

(Continued)

OTHER PUBLICATIONS

International Search Report dated May 29, 2006 for PCT/IB2005/051502.

*Primary Examiner* — Aimee J Li
(74) *Attorney, Agent, or Firm* — Leydig, Voit & Mayer, Ltd

(57) ABSTRACT

A processing apparatus is arranged to execute multiple-instruction words, a multiple-instruction word having a plurality of instructions. The processing apparatus comprises a plurality of issue slots (IS1, IS2) arranged for parallel execution of the plurality of instructions; a register file (RF1, RF2) accessible by the plurality of issue slots, and a communication network (CN) for coupling of the plurality of issue slots and the register file. The processing apparatus is further arranged to produce a first identifier (OV1) on the validity of first result data (RD1) produced by a first issue slot (IS1) and a second identifier (OV2) on the validity of second result data (RD2) produced by a second issue slot (IS2). The communication network comprises at least one selection circuit (SC1) arranged to dynamically control the transfer of either the first result data or the second result data to a register of the register file, in a single processor cycle, by using the first identifier and the second identifier.

9 Claims, 5 Drawing Sheets

U.S. PATENT DOCUMENTS

| | | |
|---|---|---|
| 6,535,984 B1 | 3/2003 | Hurd |
| 7,269,719 B2 * | 9/2007 | Colavin et al. ............... 712/226 |
| 2002/0040429 A1 * | 4/2002 | Dowling ..................... 712/228 |
| 2002/0042871 A1 | 4/2002 | Yoshida |
| 2004/0088526 A1 * | 5/2004 | Colavin et al. ............... 712/226 |
| 2004/0193858 A1 * | 9/2004 | Ahmad et al. ............... 712/241 |
| 2004/0210886 A1 * | 10/2004 | Jarp et al. ..................... 717/159 |

* cited by examiner

RUN-TIME SELECTION OF FEED-BACK CONNECTIONS IN A MULTIPLE-INSTRUCTION WORD PROCESSOR

TECHNICAL FIELD

The invention relates to a processing apparatus arranged to execute multiple-instruction words, a multiple-instruction word having a plurality of instructions, the processing apparatus comprising a plurality of issue slots arranged for parallel execution of the plurality of instructions, a register file accessible by the plurality of issue slots, and a communication network for coupling of the plurality of issue slots and the register file.

BACKGROUND ART

Processors can be general-purpose processors or application-specific instruction-set processors. They can be used for manipulating different types of information, including sound, images and video. In case of application specific instruction-set processors, the processor architecture and instruction set is customized, which reduces the system's cost and power dissipation significantly. Processor architectures usually consist of a fixed data path, which is controlled by a set of control words. Each control word controls parts of the data path and these parts may comprise register addresses and operation codes for arithmetic logic units (ALUs) or other functional units. Each set of instructions generates a new set of control words, usually by means of an instruction decoder which translates the binary format of the instruction into the corresponding control word, or by means of a micro store, i.e. a memory which contains the control words directly. Typically, a control word represents a RISC like operation, comprising an operation code, two operand register indices and a result register index. The operand register indices and the result register index refer to registers in a register file.

In case of a Very Large Instruction Word (VLIW) processor, multiple instructions are packaged into one long instruction, a so-called VLIW instruction. A VLIW processor uses multiple, independent functional units to execute these multiple instructions in parallel. The processor allows exploiting instruction-level parallelism in programs and thus executing more than one instruction at a time. Due to this form of concurrent processing, the performance of the processor is increased. In order for a software program to run on a VLIW processor, it must be translated into a set of VLIW instructions. The compiler attempts to minimize the time needed to execute the program by optimizing parallelism. The compiler combines instructions into a VLIW instruction under the constraint that the instructions assigned to a single VLIW instruction can be executed in parallel and under data dependency constraints. In case no meaningful processing can take place in certain clock cycles for one or more functional units, a so-called no-operation (NOP) instruction is encoded in the VLIW instruction for that particular functional unit. In order to reduce the code size, and thus saving costs in terms of required memory size and in terms of required memory bandwidth, a compact representation of no-operation (NOP) instructions in a data stationary VLIW processor may be used, e.g. the NOP operations are encoded by single bits in a special header attached to the front of the VLIW instruction, resulting in a compressed VLIW instruction To control the operations in the data pipeline of a processor, two different mechanisms are commonly used in computer architecture: data-stationary and time-stationary encoding, as disclosed in "Embedded software in real-time signal processing systems: design technologies", G. Goossens, J. van Praet, D. Lanneer, W. Geurts, A. Kifli, C. Liem and P. Paulin, Proceedings of the IEEE, vol. 85, no. 3, March 1997. In the case of data-stationary encoding, every instruction that is part of the processor's instruction-set controls a complete sequence of operations that have to be executed on a specific data item, as it traverses the data pipeline. Once the instruction has been fetched from program memory and decoded, the processor controller hardware will make sure that the composing operations are executed in the correct machine cycle. In the case of time-stationary coding, every instruction that is part of the processor's instruction-set controls a complete set of operations that have to be executed in a single machine cycle. These operations may be applied to several different data items traversing the data pipeline. In this case it is the responsibility of the programmer or compiler to set up and maintain the data pipeline. The resulting pipeline schedule is fully visible in the machine code program. Time-stationary encoding is often used in application-specific processors, since it saves the overhead of hardware necessary for delaying the control information present in the instructions, at the expense of larger code size.

EP1.113.356 describes a VLIW processor having a plurality of functional units and a register file. Decoded instructions are provided to the functional units, and input data are provided from the register file and result data are written to the register file.

It is a disadvantage of the prior art processor that in case it is determined at run-time that result data is invalid, i.e. the result data do not have to be written back to the register file, a communication path from a functional unit to the register file still has to be enabled, as it is statically, i.e. at compile time, not known whether this result data will be valid or not.

DISCLOSURE OF INVENTION

It is an object of the invention to provide a processing apparatus which allows to statically schedule the write back of result data produced by two different operations into the same register of the register file, in a single processor cycle. It is a further object of the invention to statically schedule the write back of these result data on a shared communication channel.

This object is achieved with a processing apparatus of the kind set forth, characterized in that the processing apparatus is further arranged to produce a first identifier on the validity of first result data produced by a first issue slot and a second identifier on the validity of second result data produced by a second issue slot, and that the communication network comprises at least one selection circuit arranged to dynamically control the transfer of either the first result data or the second result data to a register of the register file, in a single processor cycle, by using the first identifier and the second identifier. In case it is statically known that, at least, either the first or the second identifier on the validity of the result data indicates, at run-time, that the corresponding result data do not have to be written back to the register of the register file, the write back of the first and the second result data can be scheduled in a single processor cycle. The selection circuit uses the identifiers to dynamically select the valid result data to be written back to the register file. As a result, the write back of result data produced by two different operations into the same register of the register file, can be scheduled in a single processor cycle.

An embodiment of the processing apparatus according to the invention is characterized in that the at least one selection circuit is further arranged to dynamically control the transfer of no result data to the register of the register file, in a single processor cycle, by using the first and the second identifier. In case both the first and second result data are invalid, no result data are selected to be written back to the register file.

An embodiment of the processing apparatus according to the invention is characterized in that the at least one selection circuit is coupled to an output of the first and the second issue slot, respectively. The selection of which result data have to be written back to the register file is directly made at the outputs of the issue slots.

An embodiment of the processing apparatus according to the invention is characterized in that the communication network is arranged to transfer either the first result data or the second result data via a shared communication channel. An advantage of this embodiment is that other communication channels are available for other issue slots to transfer result data to the register file.

An embodiment of the processing apparatus according to the invention is characterized in that the at least one selection circuit is coupled to an input of the register file, providing an alternative for coupling the selection circuit to the outputs of the issue slots.

An embodiment of the processing apparatus according to the invention is characterized in that the first result data corresponds to a first conditional operation and the second result data corresponds to a second conditional operation, the first and second conditional operation having mutually exclusive conditions, and wherein the first identifier is set according to the evaluation of the condition of the first conditional operation and the second identifier is set according to the evaluation of the condition of the second conditional operation. In case of mutually exclusive conditions, it is guaranteed that at most one of the identifiers will indicate that the corresponding result data are invalid, allowing to statically schedule the write back of both result data to the same register in a single processor cycle.

An embodiment of the processing apparatus according to the invention is characterized in that the first and second issue slot are arranged to produce the, first and the second identifier on the validity of the result data. This embodiment allows to store the results of the guards of the conditional operations in the register file, and to use them as an additional input value of the issue slots, for determining the value of the first and second identifier, respectively.

An embodiment of the processing apparatus according to the invention is characterized in that the selection circuit is further arranged to statically control the transfer of either first result data from a first issue slot or second result data from a second issue slot, to the register file, using control information derived from a multiple-instruction word. Using the control information, a communication channel via which result data have to be written can be selected, and in case of a no-operation instruction, write back of result data to the register file can be prevented.

An embodiment of the processing apparatus according to the invention is characterized in that the communication network further comprises a second selection circuit coupled to an input of the register file. An advantage of this embodiment is that it provides more flexibility in scheduling instructions in case of a partially connected network.

An embodiment of the processing apparatus according to the invention is characterized in that the register file is a distributed register file. An advantage of a distributed register file is that it requires less read and write ports per register file segment, resulting in a smaller register file in terms of silicon area, and that it increases the speed of operation of the register file. Furthermore, the addressing of a register in a distributed register file requires less bits when compared to a central register file.

An embodiment of the processing apparatus according to the invention is characterized in that the communication network is a partially connected communication network. A partially connected communication network is often less time critical and less expensive in terms of code size, area and power consumption, when compared to a fully connected communication network, especially in case of a large number of issue slots.

An embodiment of the processing apparatus according to the invention is characterized in that the at least one selection circuit is further arranged to dynamically control the transfer of at least third result data to the register of the register file, in a single processor cycle, by using a corresponding identifier on the validity of the result data. The selection circuit allows to have more than two input ports for receiving result data, and to dynamically select at most one result data to be written back to the register file, as long it is statically known that at most one result data will be valid.

DESCRIPTION OF PREFERRED EMBODIMENTS

Figure 1:
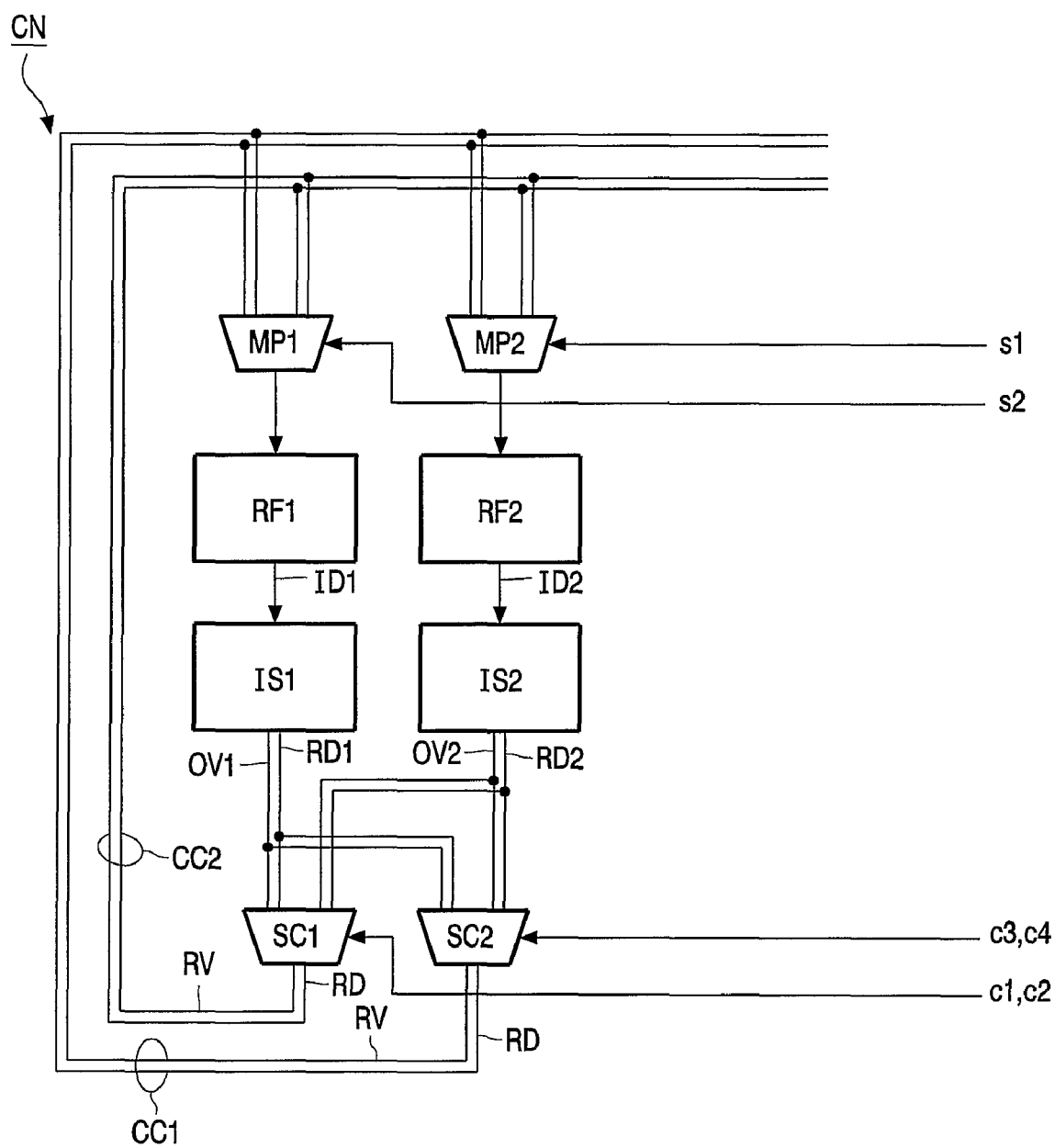
FIG. 1 shows a schematic block diagram of a VLIW processor according to the invention.
Figure 3:
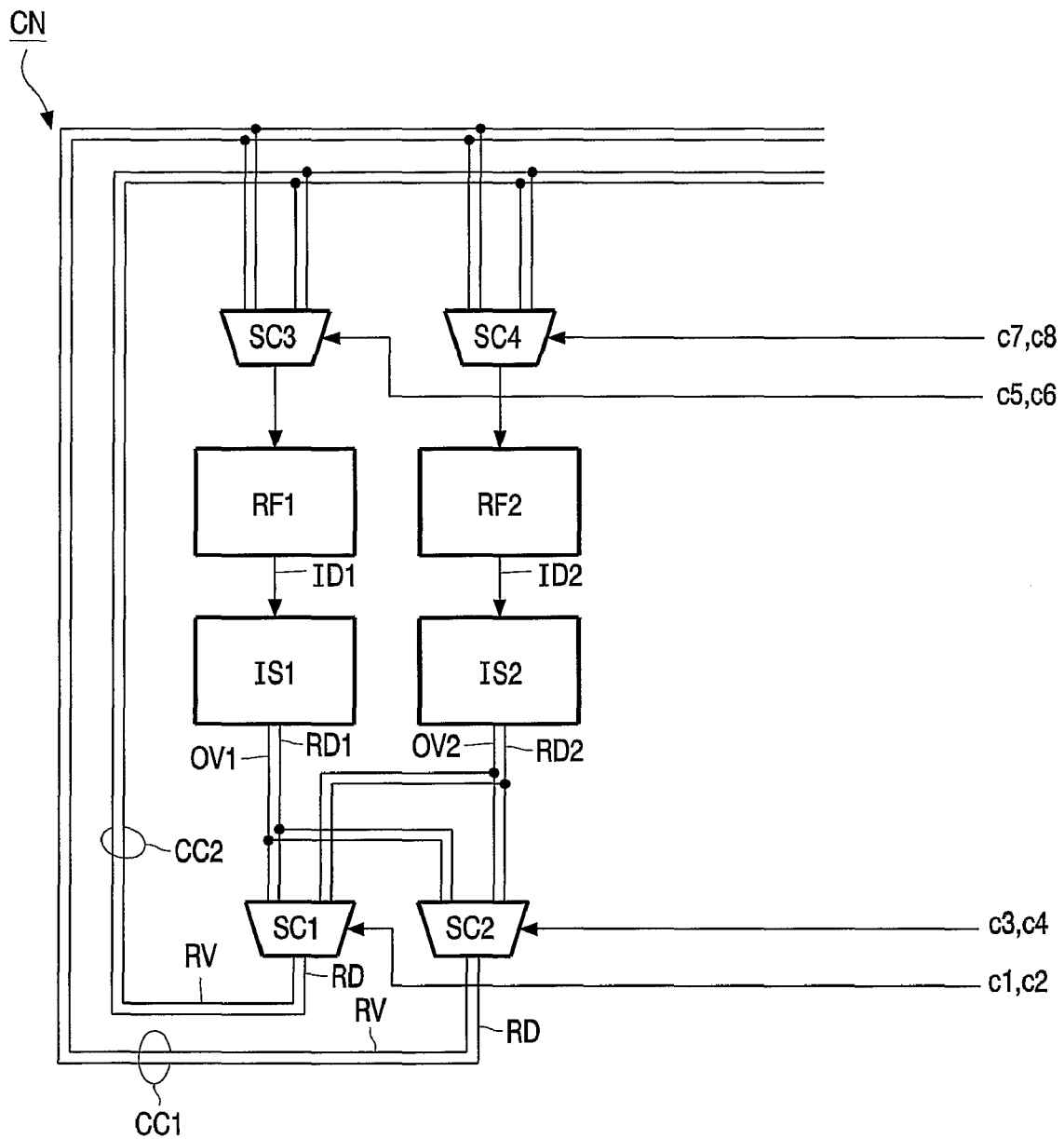
FIG. 3 shows a schematic block diagram of an alternative VLIW processor according to the invention.
Figure 5:
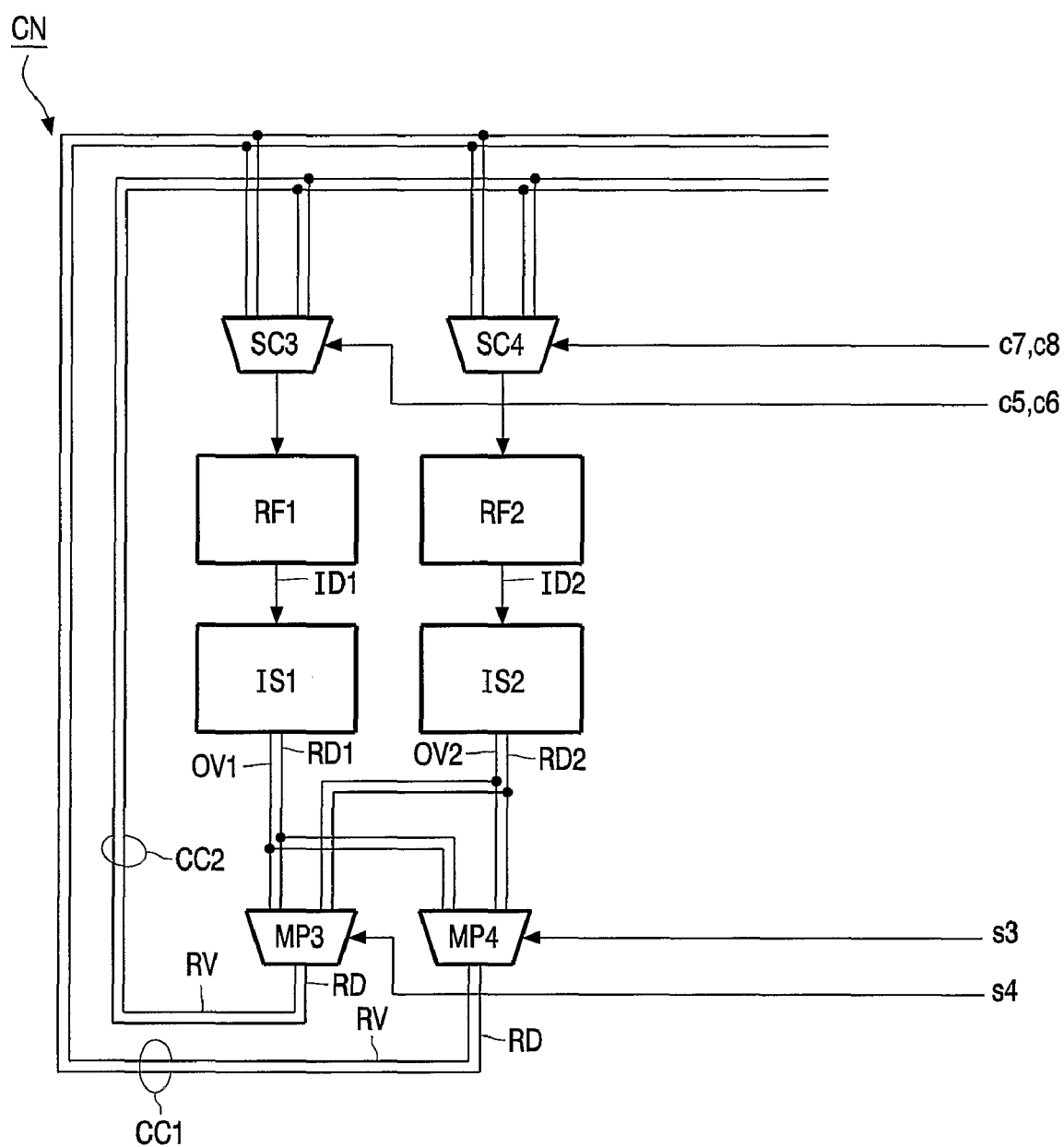
FIG. 5 shows a schematic block diagram of another further alternative VLIW processor according to the invention.

Referring to FIG. 1, 3 and 5, a schematic block diagram illustrates a VLIW processor comprising two register files RF1 and RF2, and two issue slots IS1 and IS2. Register file RF1 is accessible by issue slot IS1, and register file RF2 is accessible by issue slot IS2, for retrieving arguments ID1 and ID2, respectively. The issue slots IS1 and IS2 are further coupled to the register files RF1 and RF2 via connection network CN. Connection network CN comprises two selection circuits SC1 and SC2 (only FIG. 1 and 3), two multiplexers MP1 and MP2 (only FIG. 1), two multiplexers MP3 and MP4 (only FIG. 5), two selection circuits SC3 and SC4 (only FIG. 3 and 5) and two communication channels CC1 and CC2. The communication channels CC1 and CC2 carry a 32 bit value, for example, for result data RD, and a one bit value, for example, for result valid signal RV. The issue slots IS1 and IS2 comprise at least one functional unit, for example issue slot IS1 comprises an arithmetic/logical unit and a multiplication unit, and issue slot IS2 comprises an arithmetic/logical unit and a load/store unit. The arithmetic/logical unit has internally zero pipeline stages and can perform seven different operations: add, substract, logic AND, logic OR, logic XOR, logic-shift-left and logic-shift-right, which are controlled by respective operation codes. The multiplication unit has internally one pipeline stage, and can perform four different operations: signed multiply lower half result, signed multiply upper half result, unsigned multiply lower half result, unsigned multiply upper half result, which are also controlled by respective operation codes. In operation, VLIW instruction words are retrieved from a program memory, not shown in FIG. 1, 3 and 5, and these instruction words are decoded. In general, the instructions encoded in a VLIW instruction word comprise RISC like operations, requiring two operands and producing one result, as well as custom operations that may consume more than two operands and may produce more than one result. Some instructions may require an immediate value as operand data. Results of the decoding step are selection signals s1 and s2 (only FIG. 1), selection signals s3 and s4 (only FIG. 5), selection signals c1, c2, c3 and c4 (only FIG. 1 and 3), and selection signals c5, c6, c7 and c8 (only FIG. 3 and 5). Further results of the decoding step are the operation codes, not shown in FIGS. 1, 3 and 5, for issue slot IS1 and IS2, defining the operation that has to be performed by the corresponding issue slot, as well as register indices, not shown in FIGS. 1, 3 and 5, indicating the registers from register file RF1 and RF2 from which arguments for the operations performed by the corresponding issue slot have to be read, as well register indices, not shown in FIGS. 1, 3 and 5, from register file RF1 and RF2 to which result data have to be written. The operation codes and the arguments ID1 and ID2 are provided to the issue slots IS1 and IS2, respectively. The issue slots IS1 and IS2 perform the operation defined by its operation code and produce result data RD1 and RD2, respectively, as well as output valid signals OV1 and OV2, indicating the validity of the corresponding result data. The output valid signals are one bit values, for example. In case the result data are invalid, i.e. the result data do not have to be written back to register file RF1 or RF2, the corresponding output valid signal is set to false by the issue slot producing that result data. Referring to FIG. 1 and 3, the result data RD1 and output valid signal OV1 as well as the result data RD2 and the output valid signal OV2 are provided to both selection circuit SC1 and SC2. As will be explained further, under control of the output valid signals OV1 and OV2 as well as selection signals c1 and c2, selection circuit SC1 selects either result data RD1 and output valid signal OV1, or result data RD2 and output valid signal OV2 for transfer as result data RD and result valid signal RV via communication channel CC2 to multiplexers MP1 and MP2 (FIG. 1), or to selection circuits SC3 and SC4 (FIG. 3). Analogously, under control of the output valid signals OV1 and OV2 as well as selection signals c3 and c4, selection circuit SC2 selects either result data RD1 and output valid signal OV1, or result data RD2 and output valid signal OV2 for transfer as result data RD and result valid signal RV via communication channel CC1 to multiplexers MP1 and MP2 (FIG. 1), or selection circuits SC3 and SC4 (FIG. 3). Referring to FIG. 5, under control of selection signals s3 and s4 a communication channel CC1 and CC2 is selected by multiplexer MP3 and MP4, respectively, for writing result data RD1 and corresponding output valid signal OV1, or for writing result data RD2 and corresponding output valid signal OV2, to selection circuits SC3 and SC4, as result data RD and result valid signal RV. Referring again to FIGS. 1, 3 and 5, in an alternative embodiment, one or more functional units of issue slots IS1 and IS2 support guarded operations, where an additional argument is used as a guard, for example. Time-stationary multiple-instruction word processors that support conditional operations are described in a previous European patent application no. 03101038.2 filed by the applicant. In case of a conditional operation, the value of the guard is determined and stored as an additional argument in register file RF1 or RF2. When executing the conditional operation, the value of the guard is used to set the value of the corresponding output valid signal OV1 or OV2. In case the value of the guard is equal to true, the corresponding output valid signal is set to true, if the output valid signal is not set to false by the corresponding issue slot otherwise. In case the value of the guard is equal to false, the corresponding output valid signal is set to false, i.e. the corresponding result data are invalidated and therefore not written back to register file RF1 or RF2. Alternatively, the guard is not taken as an additional argument when performing the operation, but delayed according to the pipeline of the corresponding functional unit, and ANDed with the output valid signal of that functional unit. As a result, in case the value of the guard is false, the ANDed value of the guard and output valid signal is false as well, and used to invalidate the corresponding result data.

Referring to FIG. 1, under control of selection signal s2, multiplexer MP1 selects communication channel CC1 or CC2 for writing of result data RD to register file RF1. In case the result valid signal RV is true, the writing of result data RD to register file RF1 is enabled, otherwise the writing of result data RD to register file RF1 is disabled, i.e. the result data RD are not written back to register file RF1. In case the result valid signal RV is equal to true, the result data RD are written to a register of register file RF1, selected under control of a register address derived from the VLIW instruction word. Analogously, under control of selection signal s1, multiplexer MP2 selects communication channel CC1 or CC2 for writing of result data RD to register file RF2. In case the result valid signal RV is true, the writing of result data RD to register file RF2 is enabled, otherwise the writing of result data RD to register file RF1 is disabled. In case the result valid signal RV is equal to true, the result data RD are written to a register of register file RF2, selected under control of a register address derived from the VLIW instruction word.

Figure 2:
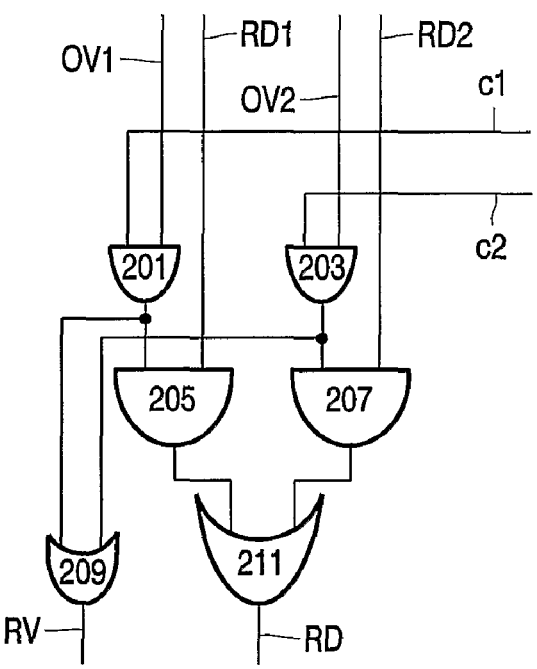
FIG. 2 shows a schematic block diagram of an embodiment of a selection circuit.

An embodiment of a selection circuit SC1 and SC2 is shown in FIG. 2. The selection circuits SC3 and SC4 have an identical embodiment. The output valid signal OV1 and selection signal c1 are input to AND gate 201. The output valid signal OV2 and selection signal c2 are input to AND gate 203. The output of AND gate 201 and result data,RD1 are input to AND gate 205. The output of AND gate 203 and result data RD2 are input to AND gate 207. The outputs of AND gate 201 and AND gate 203 are also input to OR gate 209, which outputs the result valid signal RV. The outputs of AND gate 205 and AND gate 207 are input to OR gate 211, which outputs result data RD. The output valid signals OV1 and OV2, the selection signals c1 and c2 and the result valid signal are one bit values, for example, while the result data RD1, RD2 and RD are 32 bit values, for example. In case result data RD1 or RD2 is invalidated, the selection circuit prevents that result data to be output by OR gate 211. Result data RD 1 is invalidated if the output valid signal OV1 or the selection signal c1, or both, are equal to false. Result data RD2 is invalidated if the output valid signal OV2 or the selection signal c2, or both, are equal to false. Therefore, result data RD1 are invalidated dynamically, if the output valid signal OV1 is set to false by issue slot IS1. Result data RD2 are invalidated dynamically, if the output valid signal OV2 is set to false by issue slot IS2. As a result, either result data RD1, or result data RD2 or no result data are selected to be written back to the register file. During encoding of a VLIW instruction, the write back of two result data values to the same register of register file RF1 or RF2 can be safely encoded in a single processor cycle, if it is statically known that at most one of them is valid. An example for which this condition is fulfilled is in case of an "if-then-else" construction. Consider the following program fragment:

```
if (condition)       {
                         x = a + b;
                     }
else                 {
                         x = a – b;
                     }
```

The conditions of the two operations "x=a+b" and "x=a−b" are mutually exclusive, and these operations are executed by a functional unit of issue slot IS1 and issue slot IS2, respectively. The result of either the first or the second operation has to be written to an identical register of register file RF1, referred to by variable x. The condition is evaluated in a separate instruction, and the value of the guard is stored in register file RF1 and its complement is stored in register file RF2. The VLIW instruction is encoded such that both operations are encoded in the same VLIW instruction word, selection signals c1 and c2 are both set to true, and selection signals c3 and c4 are both set to false. As a result, operation "x=a+b" is executed by issue slot IS1 and operation "x=a−b" is executed by issue slot IS2. Issue slot IS1 outputs result data RD1, with a corresponding output valid signal OV1 equal to true, assuming the guard, i.e. the evaluation of condition, is equal to true. Issue slot IS2 outputs result data RD2, with a corresponding output valid signal OV2 equal to false. Result data RD2 are invalidated by selection circuit SC1, while result data RD1 are valid, and selection circuit SC1 outputs result data RD1 as result data RD via communication channel CC2, with a corresponding result valid signal RV equal to true. Selection circuit SC2 outputs no valid result data RD, since selection signals c3 and c4 are both false. Referring to FIG. 1, using selection signal s2, communication channel CC2 is selected by multiplexer MP1, and result data RD1 are written back to the appropriate register of register file RF1. Referring to FIG. 3 and 5, by setting selection signal c6 to true, and selection signals c5, c7 and c8 to false, result data RD1 are written back to the appropriate register of register file RF1, since the result data RD corresponding to communication channel CC2 are valid, i.e. the corresponding result valid signal RV is equal to true, while the result data RD corresponding to communication channel CC1 are invalid and furthermore selection signal c5 is set to false. The selection circuit SC1 allows to schedule the write back of result data from both operations shown in the above program fragment in a single processor cycle, by using the output valid signals OV1 and OV2 to invalidate at least one of the result data RD1 and RD2. As a result, the write back of the result data from both operations does not have to be scheduled in two different processor cycles, as would have been the case if instead of selection circuit SC2 a conventional multiplexer was used. Furthermore, the write back of result data RD1 and RD2 is scheduled on a shared communication channel CC2, leaving the other communication channel CC1 free for writing back of result data if, for example, a third issue slot is present, coupled to communication channel CC1. In an alternative embodiment, the value of selection signals c1 and c4 is set to true, and the value of selection signals c2 and c3 is set to false. In the above example, result data RD1 are valid and are output as result data RD via communication channel CC2, with a corresponding result valid signal RV equal to true. Result data RD2 are invalidated by selection circuit SC1, since selection signal c2 is equal to false. Selection circuit SC2 outputs no valid result data RD, since selection signal c3 is set to false, and result data RD2 are invalidated by output valid signal OV2 being equal to false. When encoding a VLIW instruction to be executed by a VLIW processor according to FIG. 1, 3 or 5, the write back of two result data to an identical register of register file RF1 or RF2 can be scheduled in a single processor cycle if it can be proven statically that at most one of these result data is valid, the write back can then be even scheduled on a shared communication channel CC1 or CC2, but it has to be prevented statically that two valid result data are written back to an identical register of register file RF1 or RF2 in a single processor cycle. The value of the selection signals c1-c4 is determined statically, i.e. at compile time, and used to select a communication channel CC1 and/or CC2 to write back result data to register file RF1 and RF2. Another advantage of the VLIW processors according to FIG. 1 and 3 is that it is not necessary to encode a dedicated no-operation instruction in the instruction set. In case a no-operation instruction is scheduled on issue slot IS1, for example, all result data produced by issue slot IS1 are invalidated using selection signals c1 and c3, and an arbitrary operation code for encoding the no-operation instruction can be used. Advantageously, the instructions are encoded in such a way that if a no-operation instruction is scheduled, the values used for encoding fields representing the no-operation instruction are repeated as much as possible from an adjacent instruction for the same issue slot. As a result, the corresponding combinatoric logic in the VLIW processor will carry the same value as in the preceeding or succeeding cycle and consequently less rippling of data transitions and therefore unnecessary power consumption occurs. Similarly, referring to FIG. 5, selection signals c5 and c7 can be used to invalidate all result data produced by issue slot IS1 in case of a no-operation instruction scheduled for that issue slot.

Figure 4:
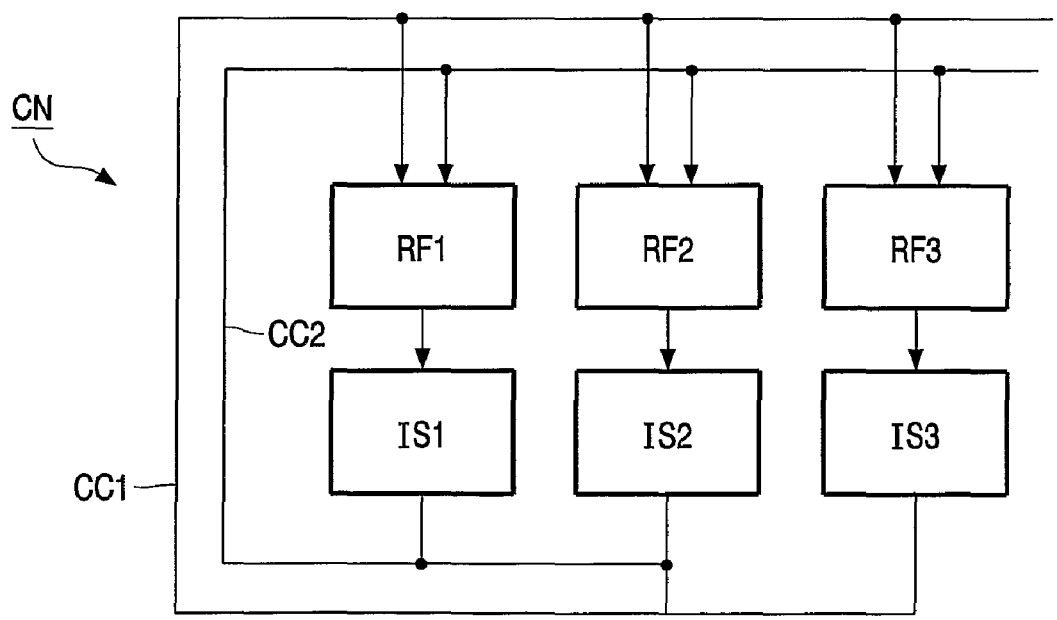
FIG. 4 shows a schematic block diagram of a further alternative VLIW processor according to the invention.

Referring to FIG. 3, the presence of selection circuits at both the outputs of the issue slots, i.e. selection circuits SC1 and SC2, and at the inputs of the register files, i.e. selection circuits SC3 and SC4, has the advantage that it provides more flexibility in the scheduling of instructions in case of a partially connected communication network. In case of a large number of issue slots, the overhead of a fully connected communication network will be considerable in terms of silicon area, delay and power consumption. During design of the VLIW processor it is decided to which degree the issue slots are coupled to the register files, depending on the range of applications that has to be executed. Referring to FIG. 4, a VLIW processor with a partial interconnect is shown. The VLIW processor comprises three register files RF1, RF2 and RF3, accessible by issue slots IS1, IS2 and IS3, respectively. For reasons of simplicity, the connection network CN is shown without the selection circuits that are actually coupled to the outputs of issue slot IS1, issue slot IS2 and issue slot IS3, as well as to the inputs of register file RF1, register file RF2 and register file RF3. Issue slot IS1 can only write back result data to the register files via communication channel CC2, and issue slot IS3 can only write back result data to the register files via communication channel CC1, i.e. the VLIW processor has a partially connected network. Again for reasons of simplicity, the communication channels CC1 and CC2 are shown as a single line, but actually carries values for both the result data RD and result valid signal RV. Assume the following program fragment has to be executed by the VLIW processor:

```
if (condition)       {
                         x = a + b;
                     }
else                 {
```

-continued

```
                    x = a - b;
              }
z = y*y
```

Assuming guarded operations can be executed by issue slots IS1, IS2 and IS3, these operations can be scheduled as three operations:

| Operation 1: | if (condition)  | { x = a + b; } |
| Operation 2: | if (!condition) | { x = a - b; } |
| Operation 3: | z = y*y         |                |

Operation 1 is executed by issue slot IS1, operation 2 is executed by issue slot IS2 and operation 3 is executed by issue slot IS3. The variable x of operations 1 and 2 refers to the same register of a register file RF1 or RF2. Issue slots IS1 and IS2 can write their respective result data in a single processor cycle to the appropriate register file, using communication channel CC2 as a shared channel. In the same processor cycle, issue slot IS3 can write its result data to the appropriate register file via communication channel CC1. Alternatively, in case issue slot IS2 does not support addition and subtraction as operations, then operation 1 can be executed by issue slot IS1 and operation 2 can be executed by issue slot IS3. However, since issue slots IS1 and IS3 are not coupled to a common communication channel, the respective result data have to be written to the appropriate register file via communication channel CC2 and CC1, respectively. Assuming that the register files RF1 and RF2 are single port register files, i.e. only one value can be written in a register file in a single processor cycle, the write back of the result data of issue slots IS1 and IS3 can still be scheduled in a single processor cycle, since the selection circuits at the inputs of the register files RF1, RF2 and RF3 will dynamically select the valid result data, using the value of the corresponding result valid signal. In case multiplexers were present at the inputs of the register files RF1, RF2 and RF3, instead of the selection circuits, the selection of a communication channel CC1 or CC2 has to be made statically, and then the write back of result data from issue slot IS1 and IS3 would have to be scheduled in two separate processor cycles instead of a single processor cycle. Hence, having the selection circuits both at the outputs of the issue slots, where appropriate, and at the inputs of the register files, increases the flexibility in scheduling of instructions, and therefore allows tighter instruction schedules.

Referring to FIG. 5, in an alternative embodiment the selection of a communication channel CC1 or CC2 for writing result data RD1 or RD2 to register files RF1 and RF2 is made via multiplexers MP3 and MP4, using selection signals s3 en s4. Using selection circuits SC3 and SC4, under control of selection signals c5, c6, c7 and c8, only valid result data RD1 or RD2 are written to a register in register file RF1 or RF2. Referring to the first program fragment, the write back of result data from both operations can be scheduled in a single processor cycle. By executing the first operation on issue slot IS1 and the second operation on issue slot IS2, respectively, and scheduling the write back of the result data in a register of register file RF1 in the same processor cycle, via communication channel CC2 and communication channel CC1, respectively, the result data RD corresponding to either result data RD1 or result data RD2 are invalidated by selection circuit SC3. Therefore, only the valid result data RD are written back to the register of register file RF1.

Figure 6:
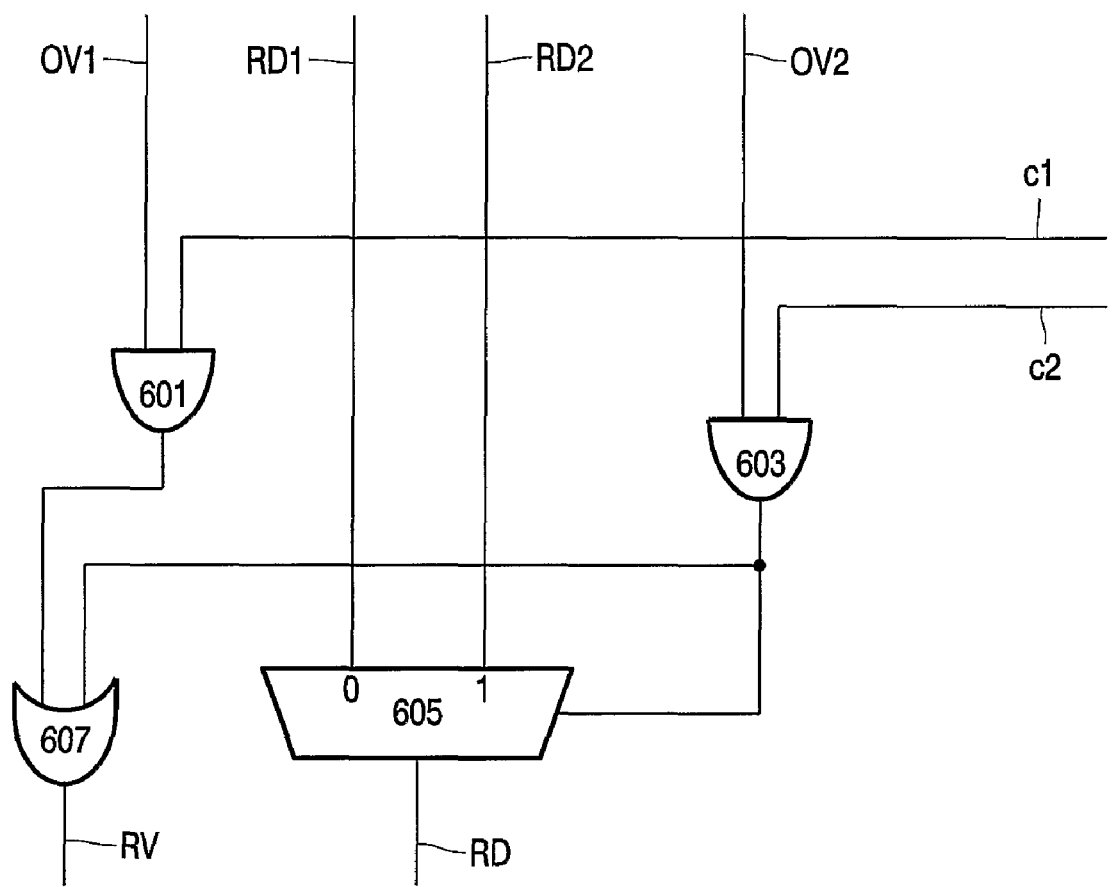
FIG. 6 shows a schematic block diagram of an alternative embodiment of a selection circuit.

Referring to FIG. 6, an alternative embodiment of a selection circuit SC1 is shown. The selection circuit SC1 comprises a multiplexer 605, which selects either the result data RD1 or RD2 to be written back as result data RD to the register file RF1 and/or RF2, under control of a signal provided by AND gate 603. The output valid signal OV1 and selection signal c1 are input to AND gate 601. The output valid signal OV2 and selection signal c2 are input to AND gate 603. The output of both AND gate 601 and AND gate 603 are input to OR gate 607. The output of AND 603 is also input to multiplexer 605, for controlling the selection of either result RD1 or RD2 to be written as result data RD to the register file. OR gate 607 outputs the result valid signal RV. Result data RD2 are selected to be written back as result data RD in case both selection signal c2 and output valid signal OV2 are equal to true, otherwise result data RD2 is selected to be written back as result data RD. The value of the result valid signal RV is determined by the values of the selection signals c1 and c2, as well as the output valid signals OV1 and OV2, using AND gates 601 and 602, and OR gate 607. In case the result valid signal RV is equal to false, the corresponding result data RD will not be actually written into the register file. Similarly, the selection circuits SC2, SC3 and SC4 may have this alternative embodiment.

In another embodiment, the selection circuits SC1, SC2, SC3 or SC4 may comprise three or more input ports, allowing to dynamically select result data from three or more result data to be written back to the register file. Each result data has a corresponding output valid signal. In case it is known at compile time that at most one of the output valid signals will be valid at run-time, the write back of the result data can be safely scheduled in a single processor cycle.

In another embodiment, the processor comprises a single register file, instead of a distributed register file comprising register files RF0 and RF1. In case the number of issue slots of a VLIW processor is relatively small, the overhead of a single register file is relatively small as well.

In another embodiment, the VLIW processor may have a different number of issue slots and/or an issue slot may comprise a different number of functional units. The number of functional units depends on the type of applications that the VLIW processor has to execute, amongst others. The processor may also have a different number of register files, connected to said issue slots.

In another embodiment, the issue slots IS0 and IS1 may have a different number of input and/or output ports, depending on the type of operations that the issue slots have to perform, i.e. operations that require more than two operands and/or produce more than one result. The register files RF0 and/or RF1 may also have a different number of read and/or write ports.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A processing apparatus arranged to execute multiple-instruction words, a multiple-instruction word having a plurality of instructions, comprising:
   i. a plurality of issue slots arranged for parallel execution of the plurality of instructions;
   ii. a plurality of register files accessible by the plurality of issue slots;
   iii. a communication network for coupling the plurality of issue slots and the register files,
   iv. characterized in that the processing apparatus is further arranged to produce a first identifier on a validity of a first result data produced by a first issue slot and a second identifier on a validity of a second result data produced by a second issue slot,
   v. in that the communication network comprises first selection circuits and second selection circuits arranged to dynamically control a selective write back of the first result data and the second result data to a register of the register files, in a single processor cycle, by using the first identifier and the second identifier,
   vi. wherein the first selection circuits are coupled to outputs of the issue slots, respectively, and
   vii. wherein the second selection circuits are coupled to inputs of the register files, wherein the first selection circuits select result data and output valid result data for transfer as selected result data and result valid signal via a communication channel to the second selection circuits, and wherein the second selection circuits dynamically select a valid result data from the selected result data using a value of a corresponding result value signal.

2. A processing apparatus according to claim 1, characterized in that at least one of the first and the second selection circuits is further arranged to dynamically control the transfer of no result data to the register of the register files, in a single processor cycle, by using the first and the second identifier.

3. A processing apparatus according to claim 1, characterized in that the communication network is arranged to transfer either the first result data or the second result data via a shared communication channel.

4. A processing apparatus according to claim 1, characterized in that the first result data corresponds to a first conditional operation and the second result data corresponds to a second conditional operation, the first and second conditional operations having mutually exclusive conditions, and wherein the first identifier is set according to an evaluation of a condition of the first conditional operation and the second identifier is set according to an evaluation of a condition of the second conditional operation.

5. A processing apparatus according to claim 4, characterized in that the first and second issue slots are arranged to produce the first identifier and the second identifier on the validity of the first and second result data, respectively.

6. A processing apparatus according to claim 1, wherein at least one of the first and the second selection circuits is further arranged to statically control the transfer of either first result data from a first issue slot or second result data from a second issue slot, to the register files, using control information derived from a multiple-instruction word.

7. A processing apparatus according to claim 1, characterized in that the register files is a distributed register file.

8. A processing apparatus according to claim 1, characterized in that the communication network is a partially connected communication network.

9. A processing apparatus according to claim 1, characterized in that least one of the first and the second selection circuits is further arranged to dynamically control a write back of at least a third result data to the register of the register files, in a single processor cycle, by using a corresponding identifier on a validity of result data.

* * * * *